(12) United States Patent
Greubel

(10) Patent No.: US 7,479,885 B2
(45) Date of Patent: Jan. 20, 2009

(54) LINEAR MOTION DEVICE WITH AN RFID TAG

(75) Inventor: Roland Greubel, Ramsthal (DE)

(73) Assignee: Bosch Rexroth Mechatronics GmbH, Schweinfurt (DE)

( * ) Notice: Subject to any disclaimer, the term of this patent is extended or adjusted under 35 U.S.C. 154(b) by 235 days.

(21) Appl. No.: 11/455,414

(22) Filed: Jun. 19, 2006

(65) Prior Publication Data

US 2006/0290507 A1    Dec. 28, 2006

(30) Foreign Application Priority Data

Jun. 23, 2005    (EP) ................................. 05013555

(51) Int. Cl.
G08B 13/14    (2006.01)
(52) U.S. Cl. .................. 340/572.7; 340/572.1; 384/13
(58) Field of Classification Search ............. 340/572.7, 340/572.4, 572.1, 539.1; 384/13, 15, 45
See application file for complete search history.

(56) References Cited

U.S. PATENT DOCUMENTS

| 3,555,254 | A | | 1/1971 | Gerber |
| 3,971,264 | A | | 7/1976 | Detraz et al. |
| 5,237,509 | A | | 8/1993 | Ueta et al. |
| 5,973,598 | A | * | 10/1999 | Beigel ...................... 340/572.1 |
| 6,203,199 | B1 | * | 3/2001 | Pfeuffer ........................ 384/13 |
| 6,265,977 | B1 | * | 7/2001 | Vega et al. ............... 340/572.7 |
| 6,424,263 | B1 | | 7/2002 | Lee et al. |
| 6,441,741 | B1 | * | 8/2002 | Yoakum ................... 340/572.8 |
| 6,953,282 | B2 | * | 10/2005 | Okabe et al. ................... 384/13 |
| 7,005,987 | B2 | * | 2/2006 | Sinnett et al. ............ 340/572.1 |
| 2002/0186134 | A1 | | 12/2002 | Rehfus et al. |

FOREIGN PATENT DOCUMENTS

| DE | 1638032 | 12/1971 |
| DE | 3407716 | 9/1985 |
| DE | 1 339 014 | 8/2003 |
| EP | 0155662 | 9/1985 |
| EP | 0 971 140 | 1/2000 |
| EP | 1 615 091 | 1/2006 |
| JP | 2005-42895 | 2/2005 |
| JP | 2005-140606 | 6/2005 |
| WO | 2004/072747 | 8/2004 |
| WO | 2005/052397 | 6/2005 |
| WO | 2005/052398 | 6/2005 |

OTHER PUBLICATIONS

Katalog: "Rexroth Kugelgewindetriebe . . ." R310DE 3301, Edition Nov. 2004, pp. 118-121.

* cited by examiner

Primary Examiner—John A Tweel, Jr.
(74) Attorney, Agent, or Firm—Michael J. Striker

(57) ABSTRACT

A linear motion device has a rod, a traveler which is movably supported with at least one roller body circuit, the traveler including an electrically conductive carrier body; roller bodies braced on the electrically conductive carrier body in a load-transmitting fashion; and at least one electrically non conductive guidance component for the roller bodies, the guidance component being provided with an RFID tag, the RFID tag being accessible from outside.

10 Claims, 2 Drawing Sheets

LINEAR MOTION DEVICE WITH AN RFID TAG

CROSS-REFERENCE TO A RELATED APPLIACTION

The invention described and claimed hereinbelow is also described in German Patent Application EP 05 013 555.7 filed on Jun. 23, 2005. This German Patent Application, whose subject matter is incorporated here by reference, provides the basis for a claim of priority of invention under 35 U.S.C. 119(a)-(d).

BACKGROUND OF THE INVENTION

The invention relates to a linear motion device. Such linear motion devices are in particular roller body thread drives and linear roller bearings, such as ball bushes, ball and roller rail guides, and ball splines.

Such linear motion devices are known from the prior art and are widely used in machine tools, for instance. Typically, these devices are provided with inscriptions, such as the type, serial number, precision class, and manufacturing date. Recently, there has been a demand to make such inscriptions computer-readable, so that they can be detected automatically in keeping track of inventory, for instance. For that purpose, bar codes are already in use today.

So-called RFID tags (for radio frequency identification) are also known from the prior art. Such tags can be read out in contactless fashion with the aid of electromagnetic waves. They typically require no energy storing means, since while being read out they are supplied with energy from outside, likewise by means of electromagnetic waves. Compared to bar codes, these tags have the advantage that they can store more data and can also be read out over greater distances and without visual contact. A data processing unit is also often provided in a RFID tag, for instance to protect the stored data with encryption processes to prevent the data from being read out without authorization.

In machine tools, RFID tags in accordance with European Patent Disclosure EP 1 339 014 A1 or European Patent Disclosure EP 0 155 662 A2 are applied to tools, so that the machine controller can take the actual tool dimensions stored in memory in them into account in controlling the tool path. Tags of this kind are sold on the market for instance by the Balluff company, with the designation "Information System BIS C" and are distinguished by a high degree of protection from IP67 in accordance with IEC 60529; that is, the tags are intrinsically especially well protected against the special stresses in a machine tool from cooling lubricants, chips, and so forth, and are therefore relatively expensive.

At the same time, very inexpensive but virtually unprotected RFID tags are also known, for instance from U.S. Pat. No. 6,424,263 B1, and these are soon expected to replace the present price labels for individual products. In these tags, the applicable silicon chip and the antenna associated with it are supported by a plastic film that can be glued from outside onto the product to be identified. The antenna is often applied to the substrate film by a printing process. Moreover, work is already being done on replacing the silicon chip with a circuit comprising organic semiconductors, which can likewise be applied to the substrate film by a printing process. However, if used in a machine tool, such virtually unprotected tags would soon be destroyed.

SUMMARY OF THE INVENTION

It is therefore the object of the invention to apply a RFID tag to a linear motion device in a protected and simultaneously economical way, without impairing the function of the RFID tag.

This object is attained in that the electrically nonconductive guidance component is provided with an RFID tag, and the RFID tag is not accessible from outside. The carrier body of a linear motion device, on which the roller bodies are braced, optionally in a load-transmitting way via race inlays, is often of steel and is thus electrically conductive. Hence an RFID tag would not function if it were located in a void in the carrier body, since the steel would shield against the electromagnetic waves during the readout. If the carrier body were located on the surface, the tag would not be protected or would have to be protected in a complicated and expensive way with separate coverings.

In contrast to this, the guide elements for the roller bodies represent an ideal location for accommodating an RFID tag in a protected way. The guide elements, which for instance in a linear roller bearing are formed by the end caps, or in a ball screw for instance are formed by the deflector elements, are typically injection-molded from plastic and are thus electrically nonconductive. The electromagnetic waves upon readout can thus penetrate the guide element unhindered and reach the RFID tag. At the same time, in the plastic injection molding, it is possible at extremely minimal additional cost to provide a suitable receiving chamber for the RFID tag in the guide element. In this respect it must be taken into account that the RFID tag is very small. Hence even small guidance components, such as deflector elements and slender guide strips, can be considered as options for being incorporated.

In a preferred embodiment, the RFID tag can be located between the guidance component and the carrier body. A void for the RFID tag in the guidance component, in the form of a recess, can thus be closed by the carrier body without additional expense, and by this means the tag is protected against environmental factors. For this purpose it is necessary that the RFID tag recess be located on a side of the guidance component that is oriented toward the carrier body. The shielding effect of the carrier body with respect to the electromagnetic waves upon readout of the tag can be tolerated, since these waves, because of diffraction and reflection effects, are nevertheless propagated into the shaded region.

In this embodiment, it should be noted that the guidance components for the roller bodies can certainly also be constructed of multiple parts, as is known for instance from EP 0 971 140 A1.

DESCRIPTION OF THE PREFERRED EMBODIMENTS

Figure 1:
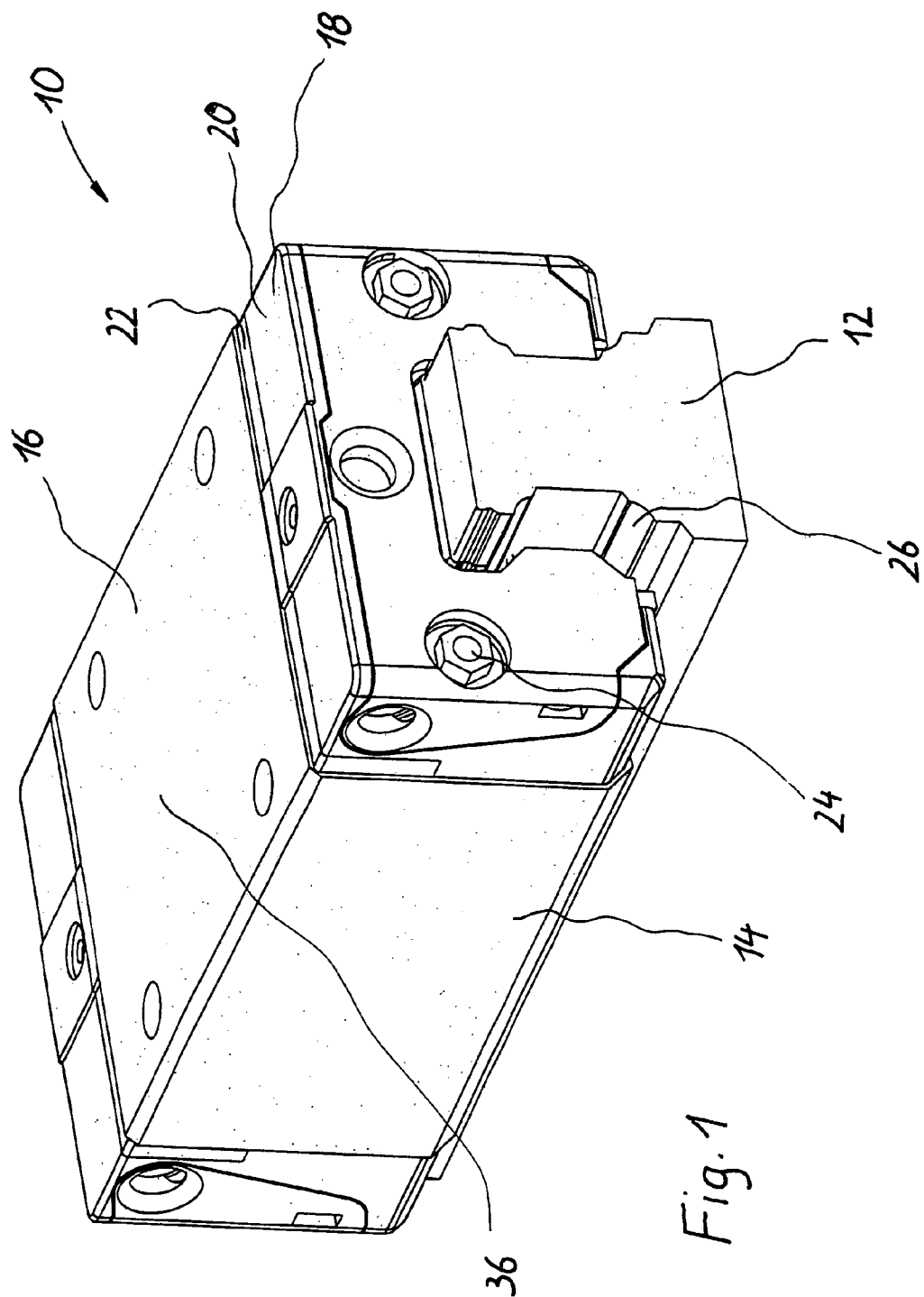
FIG. 1 is a perspective view of a linear motion device with an RFID tag in accordance with the present invention.
Figure 2:
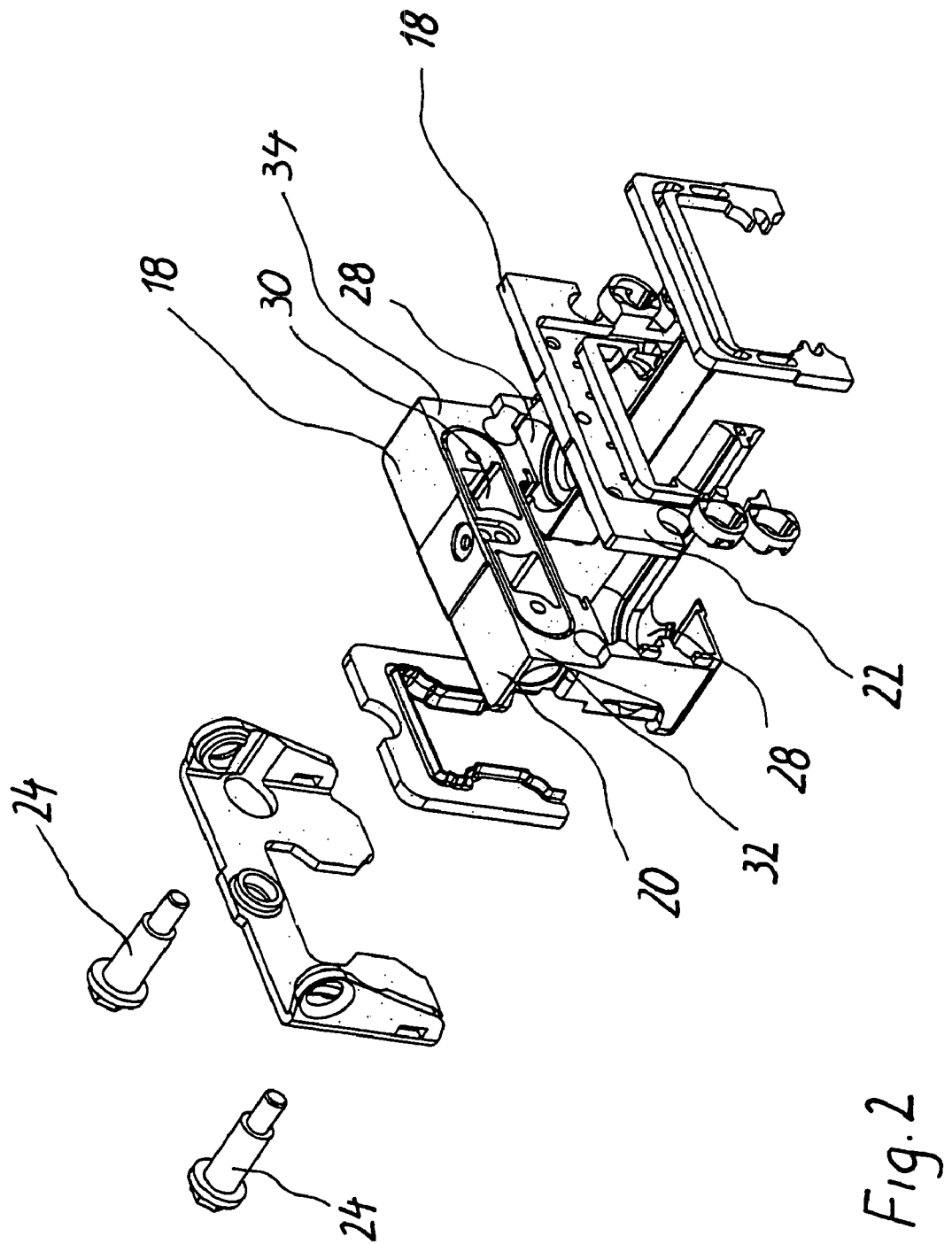
FIG. 2 is an exploded view of the inventive linear motion device with an RFID tag.

The linear motion device in the form of a ball rail guide is shown in FIGS. 1 and 2. The linear motion device 10 comprises a rod 12 and a traveler 14. The traveler 14 comprises a carrier body 16 and guidance components 18 for the roller bodies, not shown, specifically a top plate 20 and a deflection plate 22.

The top plate 20 and the deflection plate 22 are inserted into one another and secured jointly to the carrier body 16 with screws 24. The roller bodies are braced on the carrier body 16 and on the rod 12 in a load-transmitting way, so that the traveler is guided linearly movably along the rod 12. For this purpose, races 26 are provided on the rod 12, which are embodied in complementary fashion to the races, not shown, on the carrier body 16. In the top plate 20, deflection channels 28 are provided, which are defined on the inside by the deflection plate 22. The deflection channels 28 are part of an endless revolution channel in which the roller bodies revolve.

According to the invention, the RFID tag is located in the void 30 in the top plate 20 that is present anyway and is thus located between the at least one guidance component 18, namely the top plate 20, and the carrier body 16 and is not accessible from outside. However, the void 30 is closed only indirectly by the carrier body 16, since the deflection plate 22 is located between the carrier body 16 and the top plate 20.

In a further embodiment, it may be provided that the guidance component is of plastic, and the RFID tag is cast integrally with the guidance component. This embodiment is useful if the RFID tag, as is fundamentally known, is also intended to protect against product counterfeiting. In linear motion devices, product counterfeiting is a problem, since these devices are offered for sale in various precision classes, which cannot be distinguished from one another from outside yet are considerably different in price. It is therefore important that the information on the precision class of a linear motion device be attached to it in an unalterable and inseparable way. This goal can be attained with the embodiment described, because the tag can then be removed only by destroying the guidance components. Moreover, finding the tag is made considerably more difficult for a product counterfeiter. In a ball rail guide in accordance with FIGS. 1 and 2, according to the invention, the RFID tag is integrally cast in a corner region 32 of the top plate 20.

Because of the low price of an RFID tag, it is appropriate for all the guide elements to be identified by an RFID tag, making product counterfeiting still more difficult. This embodiment furthermore has the advantage that after the linear motion device has been installed, it can be checked in an automated way whether the correct components have been put together. This is especially appropriate when the guidance components are produced in different tolerance classes that can easily be mistaken for one another. For monitoring purposes, the linear motion device need merely be brought within detection range of a suitable RFID tag reader. Next, a computer that is connected to the reader can call up the various components, provided in accordance with a production parts list, in an automated way and check them for completeness and correctness of the selection.

To protect the carrier body against counterfeiting as well, provision can be made for producing the guidance component with the integrally cast RFID tag by spray-coating of the carrier body and thus connecting it solidly to the tag. The tag can thus be reduced only by destroying the carrier body, which would essentially make the linear motion device worthless. Spray-coating a linear motion device without an RFID tag is fundamentally known from U.S. Pat. No. 3,971,264.

Moreover, the RFID tag can comprise an electronic circuit and an antenna, and the antenna is applied directly to the guidance component by a printing process. By means of this design, in an RFID tag which is constructed in accordance with U.S. Pat. No. 6,424,263, for instance, the substrate film can be dispensed with. Moreover, the antenna can be applied easily to any arbitrary joining face of the guidance component, without having to provide a separate receiving recess, since it requires almost no space in the thickness direction. In the linear guide of FIGS. 1 and 2, according to the invention the antenna is printed onto the joining face 34, since the joining face is especially readily accessible for printing. Furthermore, the antenna is especially well sealed off at this point from the environment by the deflection plate 22, which is of rubber. If the electronic circuit is embodied as a silicon chip, then a recess adapted to it is provided for it in the deflection plate 22.

In a preferred embodiment, the electronic circuit comprises organic semiconductors and is applied directly to the guidance component by a printing process. The antenna and the electronic circuit can thus be applied simultaneously to the guidance component. Complicated wiring between the antenna and a conventional electronic circuit in the form of a silicon chip can be dispensed with. In the linear guide of FIGS. 1 and 2, according to the invention, the electronic circuit is printed onto the joining face 34 adjacent to the antenna.

Furthermore, the RFID tag may include a memory and a data processing unit, and stress information from outside is transmissible in wireless fashion into the memory, and the data processing unit can calculate the expected remaining life of the linear motion device from the stress information, and the result can be transmitted in wireless fashion to the outside. From German Patent DE 34 07 716 C2, it is fundamentally known to ascertain the wear status of a wear part during operation continuously by computer, so that the impending failure of the wear part can be displayed early enough. This method can also be employed in linear motion devices, since they too are subject to wear.

Because there are so many different linear motion devices and thus so many different calculation methods, it cannot be expected of the user himself that the wear calculation be programmed into the controller of the higher-level machine. On the contrary, it is desirable for the linear motion device itself to perform the applicable wear prediction. This object is attained by a linear motion device having the characteristics described above.

Hence the higher-level machine merely needs to transmit the necessary stress information to the RFID tag in wireless fashion and can then, also in wireless fashion, call up the remaining life or the wear status. For all the linear motion devices in a higher-level machine, only one RFID tag transceiver is necessary.

The requisite stress information is available anyway in the controller of the higher-level machine. In a ball screw, this information is for instance the driving torque and the number of spindle rotations. The driving torque may for instance be derived from the drive current of the electric motor that drives the spindle, and the drive current is typically regulated by the controller of the higher-level machine and is thus known. The number of spindle rotations can in turn be ascertained using the distance measuring systems that are connected to the controller of the high-level machine. The service life calculation can be done using these data, for instance as described in the catalog entitled *"Rexroth Kuqelqewindetriebe"* [Rexroth ball screws] (R310DE 3301; Addition 2004.11; pages 118 to 121) of the present Applicant by the data processing unit of the RFID tag.

The reliability of the remaining life as ascertained can be improved by providing that a sensor that detects oscillations of the traveler is provided in the linear motion device, and the oscillation information is taken into account in calculating the remaining life. From the oscillations of the traveler and in particular those of the carrier body, a statement can be made about an impending failure of the linear motion device, since the failure is often preceded by damage to the roller body races. As the roller bodies roll over the damaged races, increased oscillations occur in the carrier body. In a ball rail guide in accordance with FIGS. 1 and 2, a piezoelectric crystal can for instance be considered. Certain piezoelectric crystals, which are used in speakers as well, for instance, output an electrical voltage when they are bent. It is therefore advantageous to apply such a piezoelectric crystal to the middle strut 36 of the carrier body 16, preferably by gluing it on, since the middle strut is the portion of the carrier body that is most severely stressed in terms of bending.

The electrical voltage that the piezoelectric crystal outputs during the operation of the linear motion device is thus a measure of the oscillation motions of the carrier body and can be evaluated accordingly from the RFID tag so that in conjunction with the above-described calculation, the expected remaining life of the linear motion device can be ascertained. In this embodiment, it is advantageous if the RFID tag is supplied permanently with energy, for instance by means of a battery, so that the oscillations that occur can be evaluated at any arbitrary time, not just during the callup of the RFID tag.

In a further embodiment, the linear motion device may be a roller body thread drive, and in the RFID tag, the actual relationship between the rotary position and the travel distance of the roller body thread drive is stored in memory, and this relationship is taken into account by the controller of the higher-level machine in controlling the position of the traveler. From German Patent DE 16 38 032 C3 or U.S. Pat. No. 5,237,509, it is known to take the imprecision of a thread drive of a machine into account by means of a correction table in regulating the position. Thus instead of a linear travel measuring system, a more-economical rotary transducer can be used, without a loss of positioning precision of the machine.

The correction table, which associates the actual travel distance of the traveler with every rotary position of the threaded spindle of the roller body thread drive, is stored in memory here in the machine controller. This has the disadvantage that if the roller body thread drive is replaced, for instance in the context of repair to the higher-level machine, then the corresponding correction table must be newly ascertained and input into the machine controller. During repairs, this can be done only with difficulty in any case is very complicated and expensive. It is simpler if the manufacturer of the roller body thread drive already ascertains the corresponding information in the production of the roller body thread drive itself and then sends it to the customer. In the above-described embodiment, it is assured that this information is connected to the spindle unmistakably and in such a way that it cannot be lost, so that the controller of the higher-level machine is always operating with the correct data. It should be noted in this connection that a possible mistake cannot be recognized during operation of the higher-level machine until parts that have been produced in defective form have for instance been detected.

It will be understood that each of the elements described above, or two or more together, may also find a useful application in other types of constructions differing from the types described above.

While the invention has been illustrated and described as embodied in a linear motion device with an RFID tag, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

The invention claimed is:

1. A linear motion device, comprising a rod, a traveler which is movably supported on said rod with at least one roller body circuit, said traveler including an electrically conductive carrier body; roller bodies braced on said electrically conductive carrier body in a load-transmitting fashion; and at least one electrically nonconductive guidance component for unloaded roller bodies of said roller body circuit, said guidance component being provided with an RFID tag, said RFID tag being not accessible from outside, wherein said RFID tag is located between said guidance component and said carrier body.

2. A linear motion device, comprising a rod, a traveler which is movably supported on said rod with at least one roller body circuit, said traveler including an electrically conductive carrier body; roller bodies braced on said electrically conductive carrier body in a load-transmitting fashion; and at least one electrically nonconductive guidance component for unloaded roller bodies of said roller body circuit, said guidance component being provided with an RFID tag, said RFID tag being not accessible from outside, wherein said guidance component is composed of plastic, while said RFID tag is formed as an element which is cast integrally with said guidance component.

3. A linear motion device as defined in claim 2, wherein said guidance component is solidly joined to said carrier body by spray-coating of said carrier body.

4. A linear motion device as defined in claim 1, wherein said RFID tag includes an electronic circuit and an antenna, said antenna being applied directly to said guidance component by printing process.

5. A linear motion device as defined in claim 4, wherein said electronic circuit includes organic semi-conductors and is applied directly to said guidance component by a printing process.

6. A linear motion device as defined in claim 1, wherein all said guidance components are provided with an RFID tag.

7. A linear motion device as defined in claim 1, wherein said RFID tag includes a memory and a data processing unit, so that stress information from outside is transmittable in wireless fashion into said memory, and said data processing unit is arranged to calculate an expected remaining life of said linear motion device from the stress information, and a result is transmissible in wireless fashion to an outside.

8. A linear motion device as defined in claim 7; and further comprising a sensor that detects oscillations of said traveler in said linear motion device, so that an oscillation information is taken into account in calculating the remaining life.

9. A linear motion device as defined in claim 1, wherein said RFID tag is permanently supplied with energy.

10. A linear motion device, comprising a rod, a traveler which is movably supported on said rod with at least one roller body circuit, said traveler including an electrically conductive carrier body; roller bodies braced on said electrically conductive carrier body in a load-transmitting fashion; and at least one electrically nonconductive guidance component for unloaded roller bodies of said roller body circuit, said guidance component being provided with an RFID tag, said RFID tag being not accessible from outside for use in a higher level machine, the linear motion device being configured as a roller body thread drive, and in said RFID tag an actual relationship between a rotary position and a travel distance of said roller body thread drive is stored in a memory, and this relationship is taken into account by a controller of the higher-level machine in controlling position of said traveler.

* * * * *